United States Patent
Karpagavinayagam et al.

(10) Patent No.: US 10,331,557 B1
(45) Date of Patent: Jun. 25, 2019

(54) DISTRIBUTION OF MEMORY ADDRESS RESOURCES TO BUS DEVICES IN A MULTI-PROCESSOR COMPUTING SYSTEM

(71) Applicant: American Megatrends, Inc., Norcross, GA (US)

(72) Inventors: Manickavasakam Karpagavinayagam, Norcross, GA (US); Harikrishna Doppalapudi, Norcross, GA (US); Altaf Hussain, Tamil Nadu (IN); Purandhar Nallagatla, Johns Creek, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 15/859,174

(22) Filed: Dec. 29, 2017

(51) Int. Cl.
*G06F 12/02* (2006.01)
*G06F 12/06* (2006.01)
*G06F 13/40* (2006.01)
*G06F 13/16* (2006.01)

(52) U.S. Cl.
CPC ...... *G06F 12/0646* (2013.01); *G06F 13/1684* (2013.01); *G06F 13/4027* (2013.01); *G06F 12/023* (2013.01); *G06F 2212/1041* (2013.01)

(58) Field of Classification Search
None
See application file for complete search history.

(56) References Cited

U.S. PATENT DOCUMENTS 7,243,167 B2 * 7/2007 Zimmer .............. G06F 12/0223
710/10
8,560,805 B1 10/2013 Yakovlev

* cited by examiner

*Primary Examiner* — Brian R Peugh
(74) *Attorney, Agent, or Firm* — Newport IP, LLC Shigeta | Hope

(57) ABSTRACT

A firmware attempts to allocate memory address resources, such as memory addresses in a PCI I/O and a PCI memory address space, to bus devices in a multi-processor computing system. If an out-of-resource (OOR) condition occurs during allocation of the memory address resources, memory address resources can be re-allocated from stacks that were successfully allocated requested resources to stacks that were not successfully allocated requested resources. Memory address resources can also, or alternately, be re-allocated from sockets that were successfully allocated requested resources to sockets that were not successfully allocated requested resources. If stack-level or socket-level readjustment of the memory address resource allocation fails, a base memory address of a configuration memory address space can be lowered, and the allocation can be retried. A pre-defined memory address resource allocation table can also be utilized to allocate the memory address resources following failure of the stack-level and socket-level allocation readjustment.

20 Claims, 13 Drawing Sheets

DISTRIBUTION OF MEMORY ADDRESS RESOURCES TO BUS DEVICES IN A MULTI-PROCESSOR COMPUTING SYSTEM

BACKGROUND

When initializing a computer system bus, it is typically necessary to allocate various types of resources to devices present on the bus. For instance, the Peripheral Component Interconnect ("PCI") Bus Standard defines two types of memory address resources that are to be allocated to bus devices upon initialization: the PCI input/output ("I/O") address space (which might be referred to as "PCI I/O") and the PCI memory address space (which might be referred to as "PCI memory").

The PCI memory address space is typically utilized to map memory address resources utilized by a PCI device. For instance, PCI video cards commonly utilize relatively large amounts of the PCI memory address space for storing video information. The PCI I/O address space may be utilized, for instance, to map the internal registers of a bus device into the address space of the host computer. In the PCI Bus Standard each device also has a configuration memory address space utilized for configuring the device.

During platform initialization, PCI bus devices may specify their requirements for memory address resources. The resource requirements specify the type of memory address resources requested (e.g. PCI I/O and/or PCI memory address resources), the amount of memory address resources requested, and an alignment requirement for the requested memory address resources. Each of the PCI devices is then allocated the requested amount of memory address resources if possible. The boundaries of the allocated memory address resources are also aligned according to the alignment requirement specified by each bus device.

The PCI I/O and PCI memory address resources available for allocation to PCI devices is limited and fixed based on a platform build time resource map. As a result, it is possible for the memory address resource requirements of the bus devices installed in a computing system to exceed the available PCI I/O or PCI memory address resources. This is particularly true with respect to multi-processor computing systems. In these systems, multiple central processing units ("CPUs") can be present (e.g. two, four, or eight), with each of the CPUs having multiple root bridges. As a result, these systems can include many PCI devices, each of which must be allocated PCI I/O and/or PCI memory address resources.

When many PCI devices are present in a computing system, it is possible to exhaust the available PCI I/O or PCI memory address resources before memory address resources have been allocated to all bus devices (this condition might be referred to herein as an "out-of-resource (OOR) condition"). When an OOR condition occurs, bus devices that cannot be allocated PCI I/O or PCI memory address resources will not function and, even more problematic, the computing system can fail to boot.

It is with respect to these and other considerations that the disclosure made herein is presented.

SUMMARY

Technologies for distribution of memory address resources to bus devices in multi-processor computing systems are disclosed herein. Through an implementation of the disclosed technologies, adjustments can be made to the allocation of memory address resources to bus devices in the event of an OOR condition. Through these adjustments, memory address resources can be successfully allocated to bus devices in OOR conditions that would otherwise result in bus devices being unavailable or the failure to boot the computing system containing the bus devices. Other technical benefits can also be realized through an implementation of the disclosed technologies.

In one implementation, a firmware, such as a Unified Extensible Firmware Interface ("UEFI") Specification-compliant firmware, executes on a computing system having multiple CPUs (e.g. two, four, eight, etc.). The firmware provides various types of functionality including, but not limited to, enumerating the devices on buses in the multi-processor computing system, such as PCI buses, and allocating memory address resources to devices on the buses. For example, the firmware can allocate memory address resources in the PCI I/O address space and in the PCI memory address space to bus devices. Memory addresses in the configuration memory address space can also be allocated to bus devices.

If an OOR condition occurs during allocation of the PCI I/O or PCI memory address resources to the bus devices, the firmware can attempt to reallocate PCI I/O or PCI memory address resources from stacks that were successfully allocated requested resources to stacks that were not successfully allocated requested resources. A "stack" is a collection of bus devices connected to a root bridge.

If an OOR condition occurs during allocation of the PCI I/O or PCI memory address resources to the bus devices, the firmware can also attempt to reallocate memory address resources from sockets that were successfully allocated requested resources to sockets that were not successfully allocated requested resources. Each "socket" corresponds to a central processing unit ("CPU") present in the multi-processor computing system.

If stack-level or socket-level readjustment of the memory address resource allocation fails, two mechanisms can be utilized to address the failure. The first mechanism includes lowering a memory configuration base address and retrying the allocation. The second mechanism provides a pre-defined device table that provides a list of devices that are to be disabled following failure of the stack-level and socket-level allocation readjustment so that resource allocation will be successful.

The summary of the disclosed subject matter provided above is intended to introduce a selection of concepts in a simplified form that are further described below in the Detailed Description. This summary is not intended to identify key features or essential features of the claimed subject matter, nor is it intended that this summary be used to limit the scope of the claimed subject matter. Furthermore, the claimed subject matter is not limited to implementations that solve any or all disadvantages noted in any part of this disclosure.

DETAILED DESCRIPTION

Figure 1:
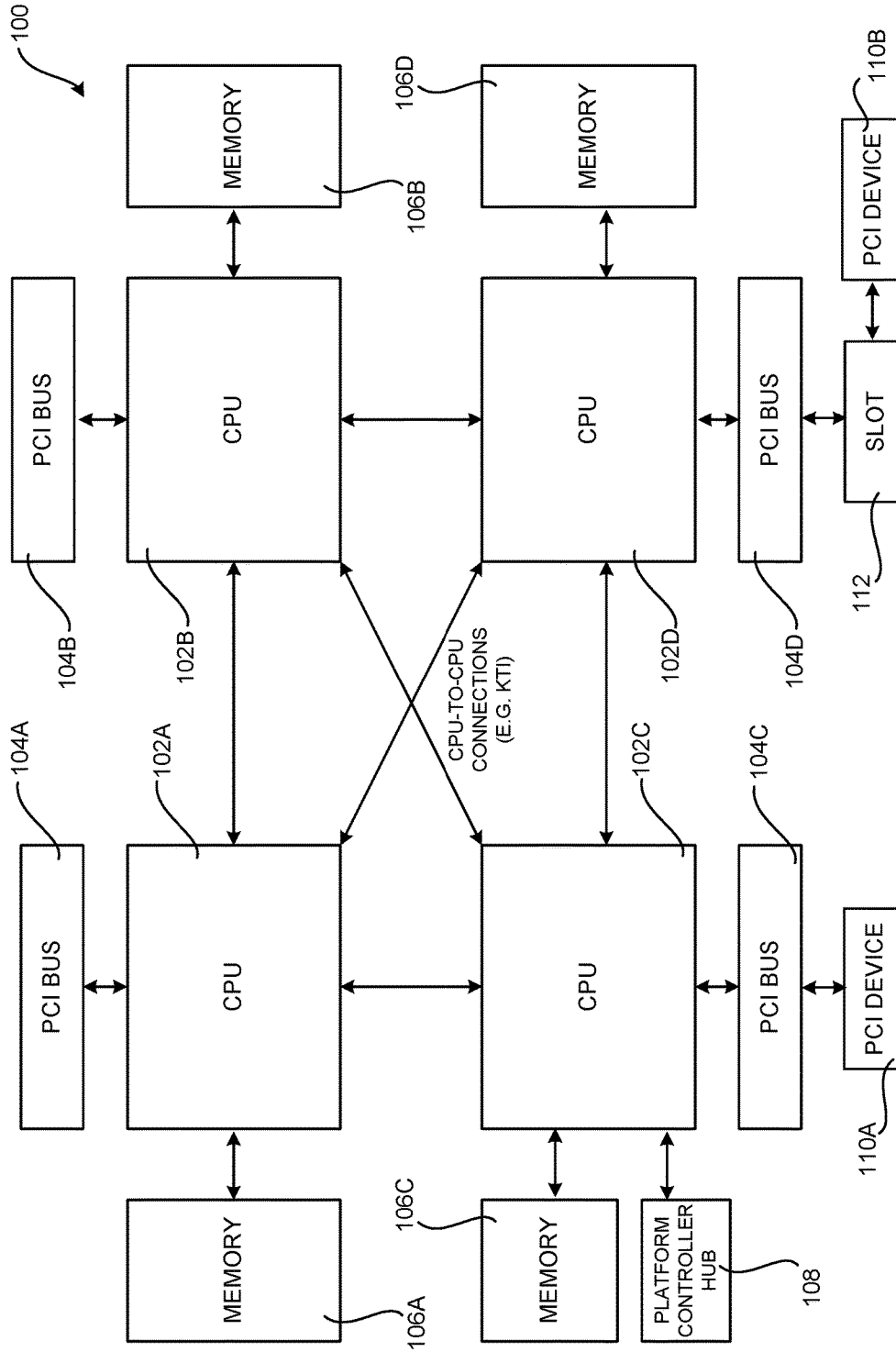
FIG. 1 is a computer architecture diagram that illustrates aspects of a multi-processor computing system that can be utilized to implement aspects of the technologies disclosed herein, according to one embodiment.

The following detailed description is directed to technologies for distribution of memory address resources to devices (which might also be referred to herein as "bus devices" or "PCI devices") in multi-processor computing systems. In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform tasks or implement abstract data types.

Those skilled in the art will appreciate that the invention can be practiced with other computer system configurations having multiple processors and at least one bus. Configurations presented herein can also be practiced in distributed computing environments where tasks are performed by remote processing devices that are linked through a communications network. In a distributed computing environment, program modules can be located in both local and remote memory storage devices.

FIG. 1 is a computer architecture diagram that illustrates aspects of a multi-processor computing system 100 that can be utilized to implement aspects of the technologies disclosed herein, according to one embodiment. The computing system 100 has multiple CPUs 102A-102D (which might be referred to as a CPU 102 or the CPUs 102). The CPUs 102 are processors that perform arithmetic and logical operations necessary for the operation of the computing system 100.

The computing system 100 may include a multitude of CPUs 102, and each CPU 102 might include multiple processing cores. The CPUs 102 can also be connected to one another using an appropriate inter-processor link such as, but not limited to the INTEL KEIZER TECHNOLOGY INTERCONNECT ("INTEL KTI") from INTEL CORPORATION. Four CPUs 102 are illustrated in the configuration shown in FIG. 1. However, it should be appreciated that other numbers of CPUs 102 (e.g. two, four, eight, etc.) can be utilized in other configurations of the computing system 100. The CPUs 102 are typically installed in sockets on a motherboard implementing the computing system 100. Each of the sockets includes a corresponding CPU 102. As will be described in greater detail below, memory address resources can be allocated (and allocations can be adjusted using the mechanisms disclosed herein) on a per socket, or CPU, basis.

The computing system 100 can also include a firmware (not shown in FIG. 1) for allocating memory address resources to bus devices in the various embodiments disclosed herein. For example, and without limitation, some computing systems utilize firmware that is compliant with a specification released by the Unified Extensible Firmware Interface ("UEFI") Forum (the "UEFI Specification"). Such a firmware might be referred to herein as a UEFI Specification-compliant firmware, a UEFI-compliant firmware, or a UEFI firmware. Other types of firmware implementations perform similar functions.

In the configuration shown in FIG. 1, the CPUs 102 are also connected to PCI buses 104A-104D, respectively (which might be referred to herein as a bus 104 or the buses 104). As will be described in greater detail below, the PCI buses 104 might each support one or more PCI devices. In the example shown in FIG. 1, for instance, the PCI device 110A is connected to the PCI bus 104C and the PCI device 110B is connected to the PCI bus 104D via a slot 112.

The PCI devices 110 may comprise cards configured for use with a PCI bus 104, such as a video card, a sound card, a network card, or a suitably configured card for providing another type of functionality. The PCI devices 110 can be connected directly to a bus 104 (e.g. the device 110A), or can be located in a slot 112 that is connected to the bus 104 (e.g. the device 110B). In this regard, it is to be appreciated that while the embodiments disclosed herein are primarily presented in the context of the PCI Bus Standard, the disclosed technologies can be utilized with other bus standards that require allocation of memory address resources to bus devices.

As shown in FIG. 1, the computing system 100 can also include a platform controller hub ("PCH") 108 in some configurations. The PCH 108 controls certain data paths and support functions used in conjunction with CPUs from INTEL CORPORATION. These can include clocking (e.g. the system clock), Flexible Display Interface ("FDI") and Direct Media Interface ("DMI"). In this way, some I/O functions can be shared between the PCH and the CPUs.

Each of the CPUs 102 also includes an interface to memory 106A-106D, respectively (which might be referred to herein collectively as "memory 106"). The memory 106 can be random access memory ("RAM"), for example, that is used as the main memory of the computing system 100. The memory 106 can be utilized to store program code, such as an operating system for the computing system 100, application programs, driver programs, and other types of programs. The RAM 106 can also be utilized to store various types of data. It is to be appreciated that the architecture of the computing system 100 shown in FIG. 1 has been simplified for discussion purposes. The computing system 100 can include other components, some of which are described below with regard to FIGS. 9-11.

As discussed briefly above, when initializing a computer system bus, such as the PCI bus 104, it is typically necessary to allocate various types of resources to devices 110 present on the bus 104. As also discussed above, the PCI Bus Standard defines two types of memory address resources that are to be allocated to bus devices upon initialization: the PCI I/O address space and the PCI memory address space (which might be referred to collectively herein as "memory address resources"). In the PCI Bus Standard each device also has a configuration memory address space utilized for configuring the device.

During initialization of a computing system 100, PCI bus devices 110 provide their requirements for memory address resources to a firmware (not shown in FIG. 1, but described in detail below). The devices specify the type of memory address resources requested, the amount of memory address resources requested, and an alignment requirement for the requested memory address resources. The firmware then attempts to allocate the requested amount of memory address resources to the bus devices 110.

Additionally, both PCI I/O and PCI memory must be allocated to devices 110 in a naturally-aligned way. For example, if a device 110 requests 0xB0 of PCI I/O space, then the allocation must be aligned on an address that is a multiple of 0xB0. Furthermore, the PCI I/O and PCI memory buses for any given device bridge must be aligned on 4K and on 1 Mbyte boundaries, respectively. In addition, the address spaces for downstream devices 110 must lie within the memory range assigned to the upstream PCI-PCI bridge (not shown in FIG. 1) for any given device 110.

The PCI I/O and PCI memory address resources available for allocation to PCI devices 110 are, however, limited and fixed. When many PCI devices 110 are present in a computing system 100, it is possible to exhaust the available PCI I/O or PCI memory address resources before memory address resources have been allocated to all of the devices 110 (this condition might be referred to herein as an "out-of-resource (OOR) condition"). When an OOR condition occurs, bus devices 110 that cannot be allocated PCI I/O or PCI memory address resources will not function and, even more problematic, the computing system 100 can fail to boot. The technologies presented herein address these technical challenges and potentially others.

Figure 2:
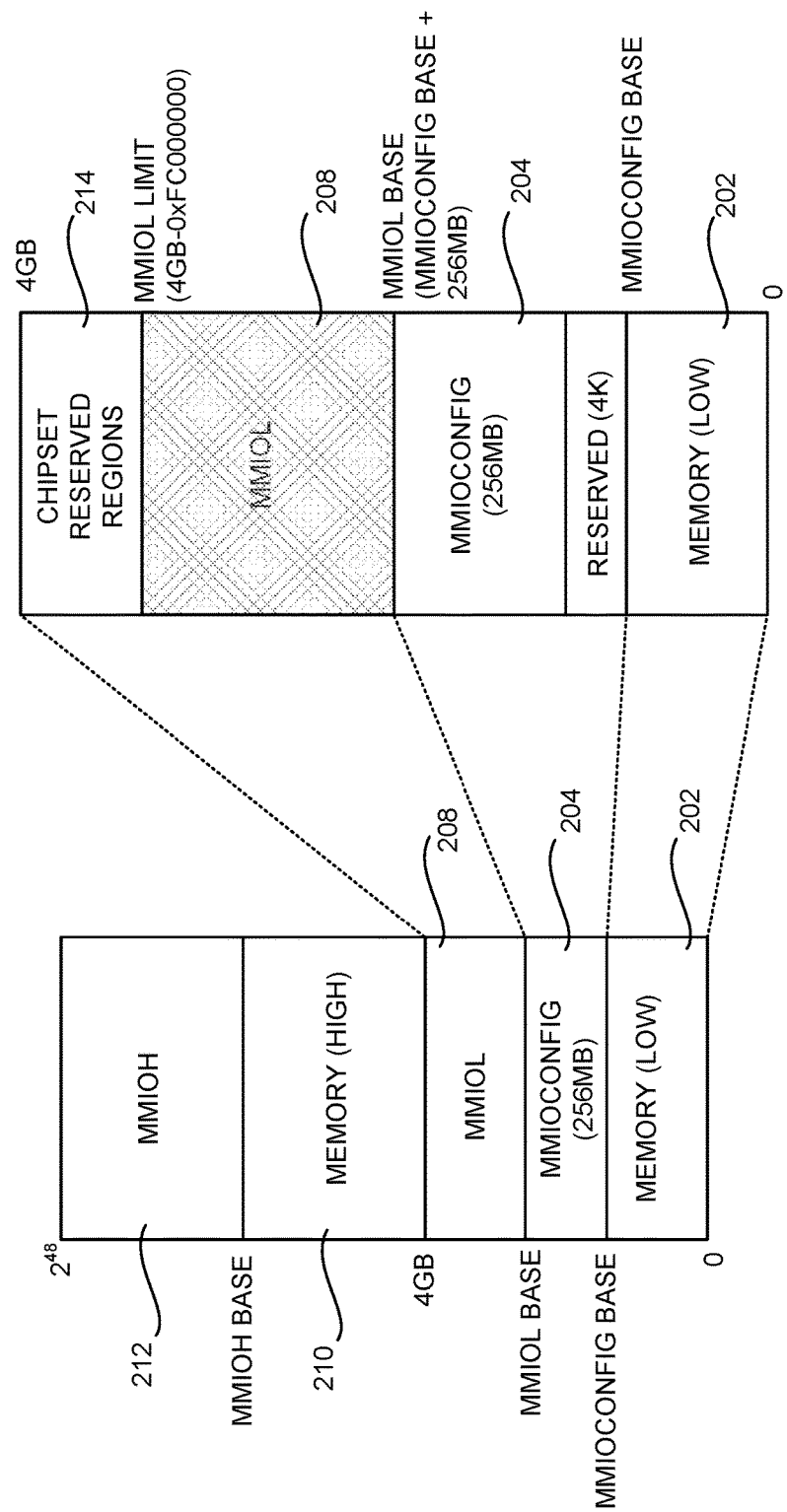
FIG. 2 is a memory map showing aspects of the PCI memory address space and the PCI configuration address space in a computing system configured to implement the functionality disclosed herein, according to one embodiment.
Figure 3:
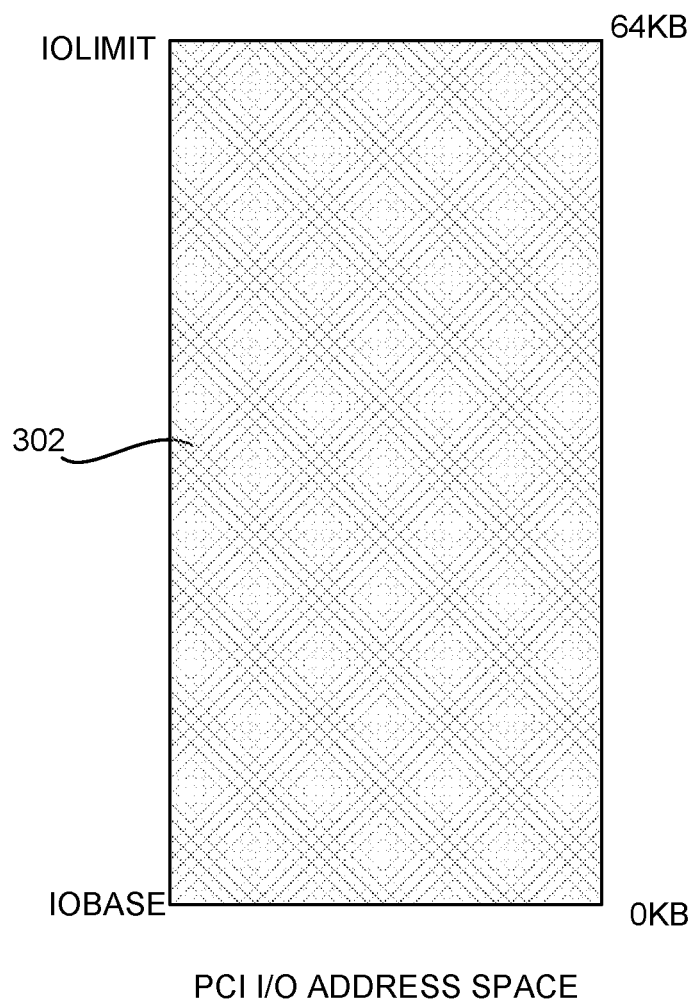
FIG. 3 is a memory map showing aspects of the PCI I/O address space in a computing system configured to implement the functionality disclosed herein, according to one embodiment.

FIGS. 2 and 3 are memory maps showing aspects of the PCI memory address space, the PCI configuration address space, and the PCI I/O address space in a computing system 100 configured to implement the functionality disclosed herein, according to one embodiment. As shown in FIG. 2, the memory address space includes low memory 202, which extends from 0000h to the base address for the PCI configuration memory address space ("MMIOCONFIG BASE") 204. 4K of the PCI configuration address space 204 is reserved, resulting in 256 MB-4K of available PCI configuration address space 204.

The PCI configuration address space 204 then extends for 256 MB ("MMIOCONFIG") to the base of a low portion of the PCI memory address space ("MMIOL BASE") 208. The low portion of the PCI memory address space ("MMIOL") 208 extends to 4 GB. As shown in FIG. 2, memory addresses can include regions that have been reserved by a chipset. MMIOL, therefore, extends from MMIOL BASE to the base of the chipset reserved regions 214. High memory 210 extends from 4 GB to the base of a high portion of the PCI memory address space ("MMIOH") 212. MMIOH extends from a base address ("MMIOH BASE") to the top of memory (e.g. $2^{48}$ bytes).

As shown in FIG. 3, the PCI I/O address space 302 extends from 0 KB ("IOBASE") to 64 KB ("IOLIMIT"). The embodiments disclosed herein are primarily concerned with the allocation of memory addresses from the PCI I/O address space and the MMIOL 208 address space to bus devices 110. It is to be appreciated, however, that aspects of the technologies disclosed herein can be utilized to allocate other ranges of memory address resources (e.g. MMIOH 212) to bus devices 110 in other configurations. Details regarding the allocation of MMIOL memory address resources and PCI I/O memory address resources to bus devices 110 will be provided in detail below.

Figure 4:
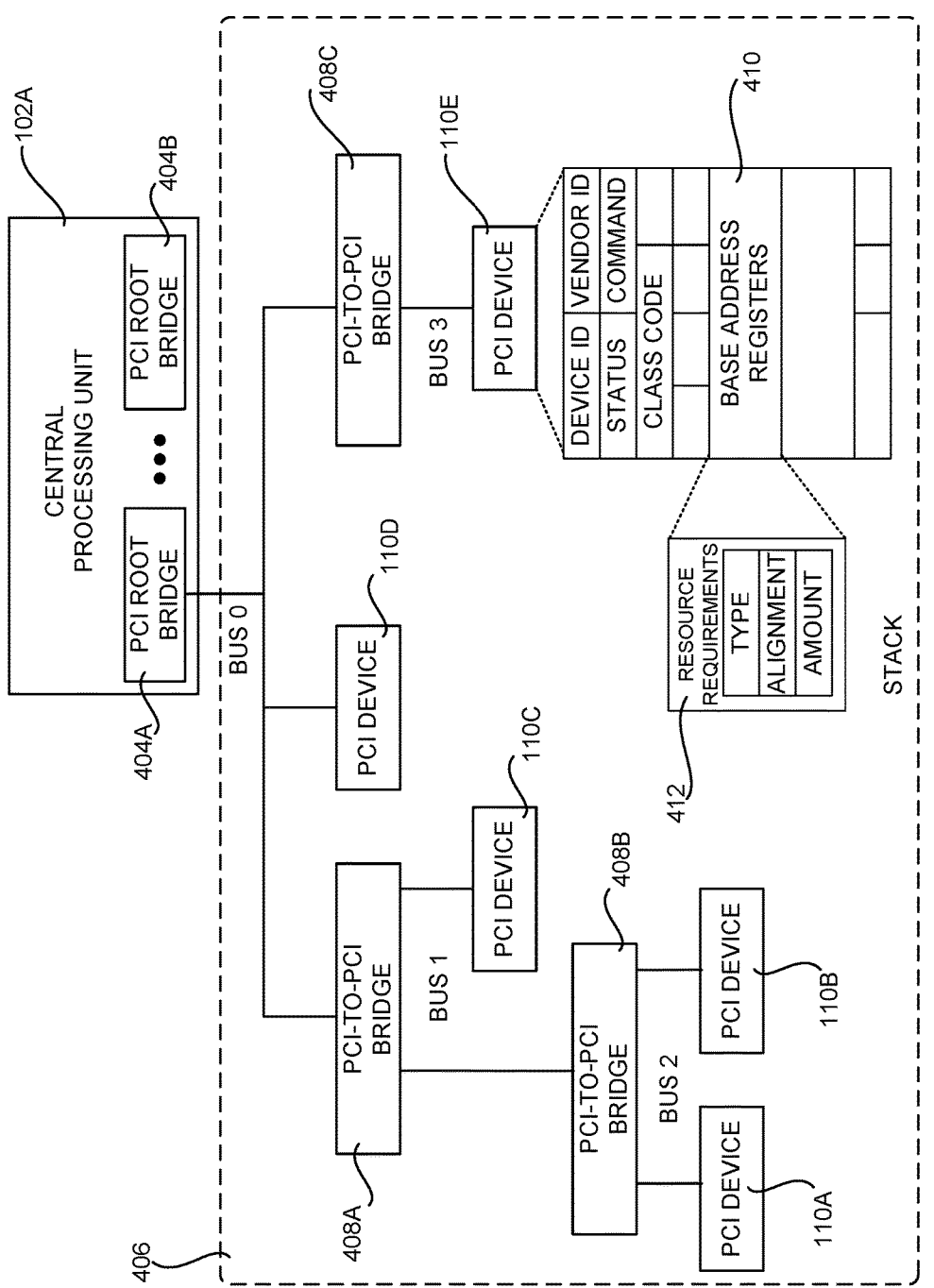
FIG. 4 is a bus diagram showing aspects of an illustrative bus configuration for a multi-processor computing system that can implement aspects of the technologies disclosed herein, according to one embodiment.

FIG. 4 is a bus diagram showing aspects of an illustrative bus configuration for a multi-processor computing system 100 that can implement aspects of the technologies disclosed herein, according to one embodiment. This example shows a portion of a typical PCI bus configuration illustrative of the PCI architecture. The PCI bus configuration shown in FIG. 4 includes a host bus (not shown in FIG. 4), to which a host CPU 102A is connected. In general, for a given computing system, a host CPU 102A will be the primary bus master for the computing system, and will be used to service interrupts and handle system errors.

As illustrated in FIG. 4, the various buses in a computing system 100 comprise a hierarchy that includes one or more levels, wherein buses at a lower level are subordinate to buses at a higher level. The first subordinate bus level below the host bus is the root bus, which is labeled "Bus 0" in the illustrative PCI bus configuration shown in FIG. 4.

Buses between levels in the hierarchy are enabled to communicate with one another using "bridges." The primary purpose of a bridge is to interface one bus protocol to another. For example, a PCI root bridge 404A is used to enable communication between the host bus and PCI bus 0. Multiple PCI root bridges 404, such as the PCI root bridge 404B, can be associated with each CPU 102. When a bridge interfaces similar bus types, the bridge primarily limits the loading on each bus. From the architecture standpoint, each PCI bridge 408 is considered an additional PCI device for which memory address resources must also be allocated.

Instances of these types of bridges are illustrated by the various PCI-to-PCI bridges 408 in FIG. 4. In particular, PCI-to-PCI bridge 408A provides an interface between Bus 0 and Bus 1, PCI-to-PCI bridge 408B provides an interface between Bus 1 and Bus 2, and PCI-to-PCI bridge 408C provides an interface between Bus 0 and Bus 3. The buses shown in FIG. 4 may be referred to herein collectively as "the buses" or individually as "a bus." Buses at a lower level in a hierarchy may be referred to as subordinate buses to buses at a higher level in the hierarchy. It should be appreciated that the embodiments disclosed herein may be utilized with more or fewer buses 104 than shown in FIG. 4.

As also shown in FIG. 4, the buses may each support one or more devices. For instance, Bus 2 includes devices 110A and 110B, while Bus 1 includes the device 110C. Bus 0 includes device 110D, and Bus 3 includes the device 110E. The devices 110 may be connected directly to a bus or might comprise cards configured for use with a PCI bus, such as a video card, a network card, or a suitably configured card for providing another type of functionality. It should be appreciated that more or fewer devices 110 may be utilized than illustrated in FIG. 4. The collection of devices 110 connected to a single PCI root bridge 404 might be referred to herein as a "stack" 406. As will be described in greater detail below, memory address resources can be allocated (and allocations can be adjusted using the mechanisms disclosed herein) on a per stack basis.

As discussed briefly above, memory address resource requirements are obtained from the devices 110 on the buses in the computing system 100. In an embodiment where a PCI bus system is utilized, each PCI device 110 is queried to determine how much of the PCI memory address space and the PCI I/O address space the device requires. In particular, all "1's" are written to the Base Address Registers ("BARs") 410 for each device 110. The contents of the BARs 410 for each device are then read back. The devices 110 will return "0's" in the "don't-care" address bits, thereby specifying the resource requirements 412 for the devices 110. As discussed briefly above, the resource requirements 412 specify the type of memory address resources requested, the amount of memory address resources requested, and an alignment requirement for the requested memory address resources.

It should be appreciated that the illustrative bus configuration shown in FIG. 4 and described above has been simplified and that additional hardware components not shown in FIG. 4 may be utilized to implement the bus architecture. It should also be appreciated that while the embodiments presented herein have been disclosed in the context of a PCI bus system, the embodiments presented herein may be utilized with other types of bus architectures and implementations.

Figure 5A:
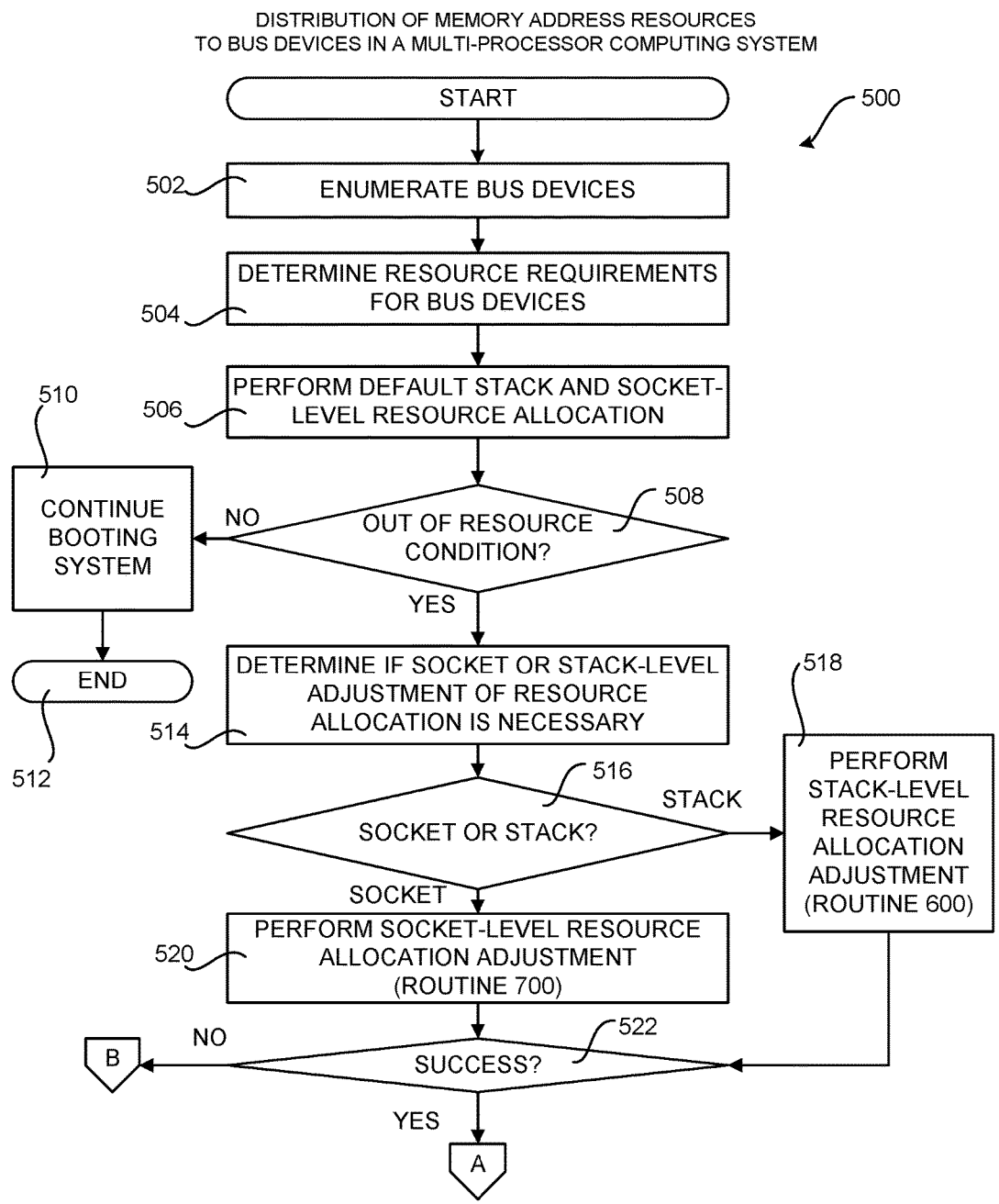
FIGS. 5A and 5B are flow diagrams showing a routine that illustrates aspects of the technologies disclosed herein for distribution of memory address resources to bus devices in multi-processor computing systems, according to one embodiment.
Figure 5B:
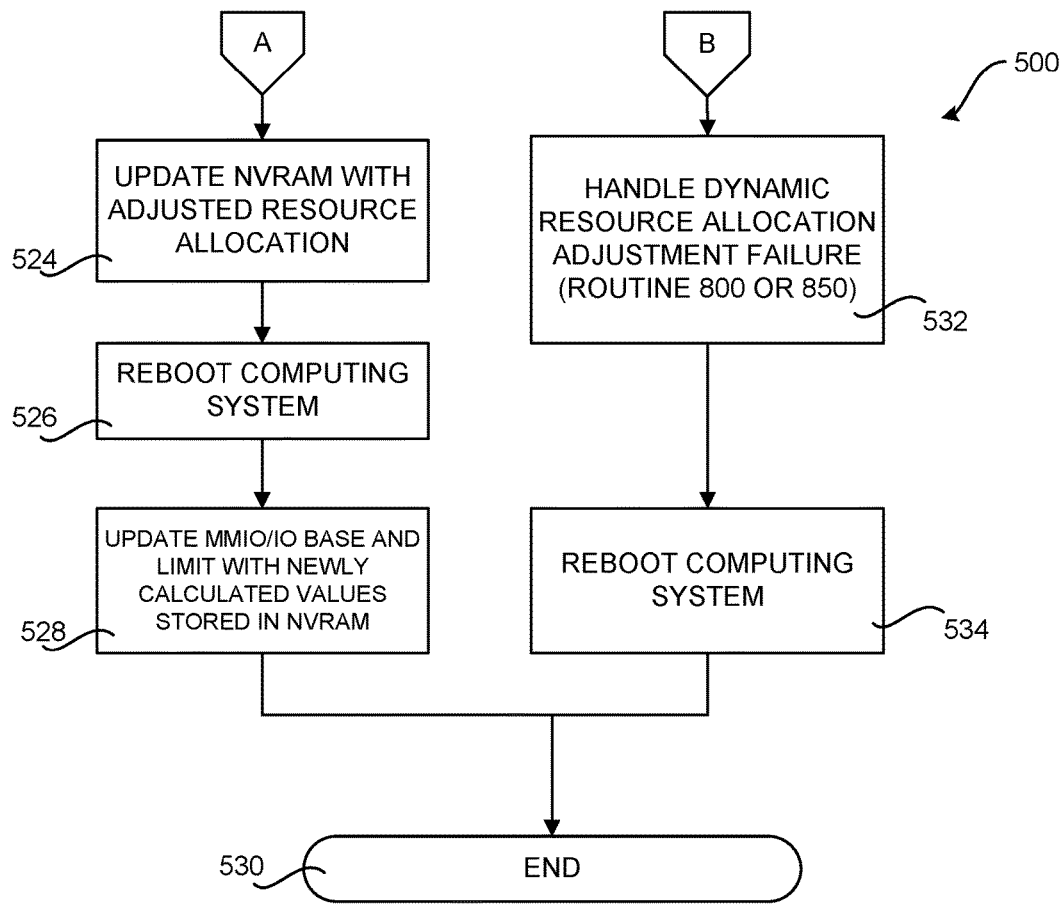

FIGS. 5A and 5B are flow diagrams showing a routine 500 that illustrate aspects of the technologies disclosed herein for allocation of memory address resources to bus devices 110 in multi-processor computing systems 100, according to one embodiment. It should be appreciated that the logical operations described herein with regard to FIGS. 5A and 5B, and the other FIGS., are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 500 begins at operation 502, where the computer system 100 begins its boot process. As part of the boot process, a firmware of the computing system 100 enumerates, or identifies, the bus devices 110 present in the computing system 100. Various mechanisms can be utilized to identify the bus devices 110 in various configurations. As discussed above, the identified bus devices 110 can be organized by "stacks" (i.e. the bus devices 110 connected to a single root bridge 404) or "sockets" (i.e. the bus devices 110 connected to a CPU 102). Once the bus devices 110 have been identified, the routine 500 proceeds to operation 504.

At operation 504, the firmware determines the memory address resource requirements for the bus devices 110 identified at operation 502. As discussed above, in an embodiment where a PCI bus system is utilized, all "1's" are written to the BARs 410 for each device 110. The contents of the BARs 410 for each device are then read back. The devices 110 will return "0's" in the "don't-care" address bits, thereby specifying the resource requirements 412 for the devices 110. The resource requirements 412 specify the type of memory address resources requested (e.g. PCI I/O or PCI memory address resources), the amount of memory address resources requested, and an alignment requirement for the requested memory address resources. Once the resource requirements have been identified, the routine 500 proceeds from operation 504 to operation 506.

At operation 506, the firmware performs a default resource allocation to the bus devices 110. The default resource allocation might allocate a pre-defined amount, or ratio, of the available memory address resources to the stacks and sockets present in the computing system 100, regardless of the number of actual bus devices 110 in the stack or socket. For instance, one-half of the available memory address resources might be allocated to each socket in a computing system 100 having two CPUs 102. In another scenario, one-fourth of the available memory address resources might be allocated to each socket in a computing system 100 having four CPUs 102. Because memory address resources are allocated to stacks and sockets using a fixed ratio, some stacks or sockets might be allocated more memory address resources than requested and other stacks or sockets might be allocated fewer memory address resources than requested.

From operation 506, the routine 500 proceeds to operation 508, where the firmware determines whether an OOR condition occurred during the allocation of the memory address resources to the bus devices 110 in the computing system 100. As discussed above, an OOR condition occurs when the available PCI I/O or PCI memory address resources are exhausted before memory address resources have been allocated to all bus devices 110. If an OOR condition has not occurred, the routine 500 continues to operation 510, where booting of the computing system 100 continues in a normal fashion. The routine 500 then proceeds from operation 510 to operation 512, where it ends.

If an OOR condition has occurred, the routine 500 proceeds from operation 508 to operation 514. At operation 514, the firmware determines whether a socket-level or stack-level adjustment of the initial memory address resource allocation is required. A socket-level adjustment of the allocation is required when the memory address resources allocated to a socket are insufficient to satisfy the requirements of the bus devices 110 connected to the socket. A stack-level adjustment of the allocation is required when the memory address resources allocated to a stack are insufficient to satisfy the requirements of the bus devices 110 in the stack.

If a stack-level adjustment of the assigned memory address resources is required, the routine 500 proceeds from operation 516 to operation 518, described below with regard to FIG. 6, where a stack-level memory address resource allocation adjustment is performed. If a socket-level adjustment of the assigned memory address resources is required, the routine 500 proceeds from operation 520 to operation 518, described below with reference to FIG. 7, where a socket-level memory address resource allocation adjustment is performed.

From operations 518 and 520, the routine 500 proceeds to operation 522, where the firmware determines whether the stack-level or socket-level memory address resource allocation adjustment was successful. If the stack-level or socket-level memory address resource allocation adjustment was successful, the routine 500 proceeds from operation 522 to operation 524, shown in FIG. 5B. If the stack-level or socket-level memory address resource allocation adjustment was unsuccessful, the routine 500 proceeds from operation 522 to operation 532, shown in FIG. 5B.

At operation 524, the firmware stores the adjusted memory address resource allocation for the bus devices 110 for use during the next boot of the computing system 100. For example, and without limitation, the firmware might store data describing the adjusted allocation in a non-volatile random access memory ("NVRAM") or another type of non-volatile memory device. Once data describing the adjusted allocation of memory address resources has been stored, the routine 500 proceeds to operation 526, where the computer system 100 is rebooted. Following the reboot, the routine 500 proceeds to operation 528, where the IOBASE, IOLIMIT, MMIOL BASE, and MMIOL LIMIT values described above are updated to reflect the adjusted allocation of memory address resources. The routine 500 then proceeds from operation 528 to operation 530, where it ends.

At operation 532, the firmware handles the failure of the dynamic memory address resource allocation adjustment process described above. The failure can be handled in different ways in different configurations. One such mechanism is described below with reference to FIG. 8A, while another mechanism is described below with regard to FIG. 8B. From operation 532, the routine 500 proceeds to operation 534, where the computing system 100 is rebooted. The routine 500 then proceeds from operation 534 to operation 530, where it ends.

Figure 6:
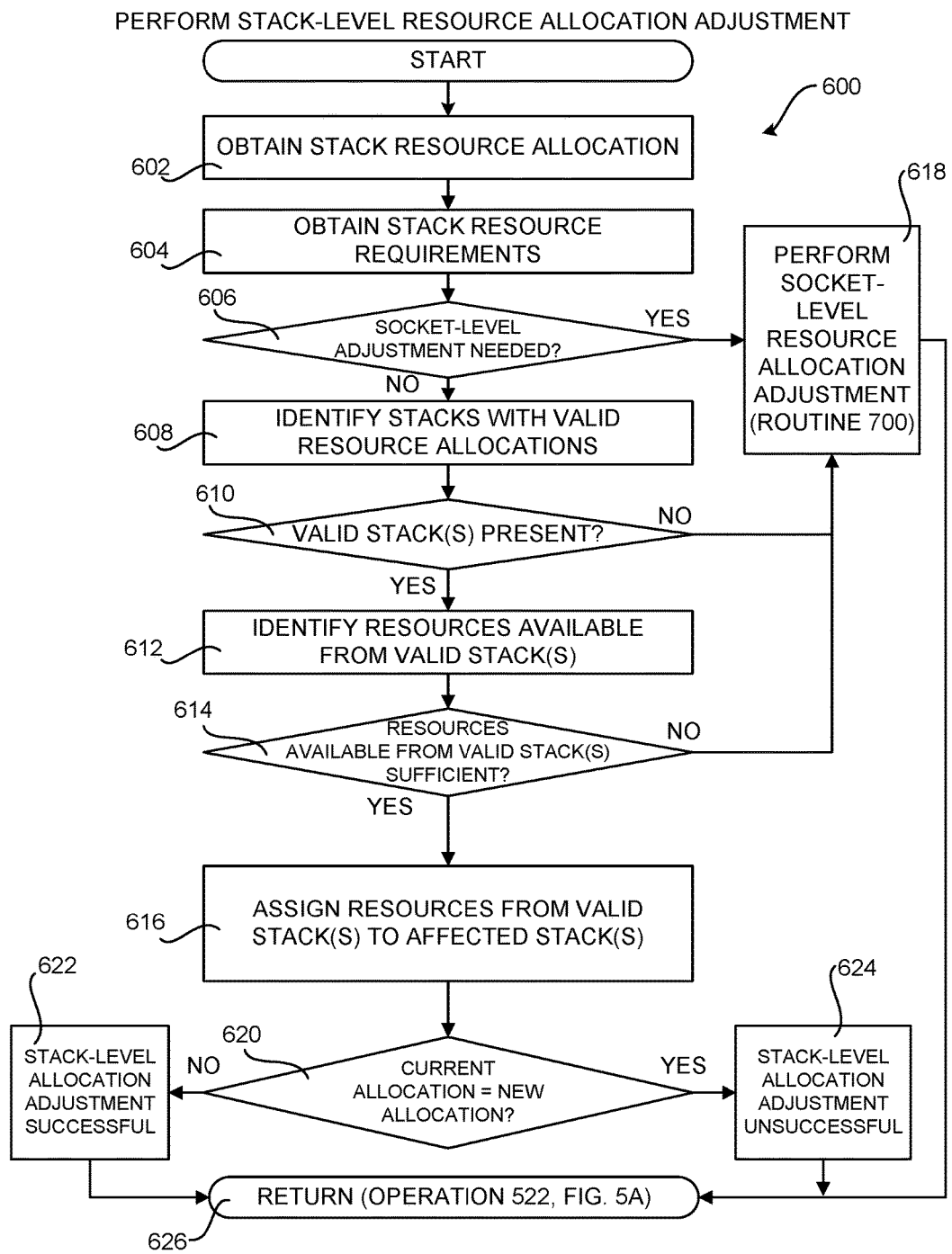
FIG. 6 is a flow diagram showing a routine that illustrates aspects of the technologies disclosed herein for performing stack-level memory address resource allocation adjustment in the event of an OOR condition, according to one embodiment disclosed herein.

FIG. 6 is a flow diagram showing a routine 600 that illustrates aspects of the technologies disclosed herein for performing stack-level memory address resource allocation adjustment in the event of an OOR condition, according to one embodiment disclosed herein. The routine 600 begins at operation 602, where the firmware obtains data describing the initial stack-level memory address resource allocation performed above at operation 506. The routine 600 then proceeds from operation 602 to operation 604, where the firmware obtains the resource requirements for the stacks in the computing system 100 in the manner described above. The routine 600 then proceeds from operation 604 to operation 606.

At operation 606, the firmware determines if a socket-level adjustment of the memory address resource allocation is needed. This might occur, for example, if the memory address resource requirements of the bus devices 110 in a stack are greater than the memory address resources allocated to the parent socket. If such a condition occurs, the routine 600 proceeds from operation 606 to operation 618, where a socket-level resource allocation adjustment is performed. This process is described below with regard to FIG. 7. From operation 618, the routine 600 returns to operation 522, described above with regard to FIG. 5A.

If no socket-level adjustment of the memory address resource allocation is required, the routine 600 proceeds from operation 606 to operation 608. At operation 608, the stacks having valid memory address resource allocations are identified. A valid allocation is one that satisfies all of the requirements of the bus devices 110 in the stack. If no stacks having valid allocations are present, the routine 600 proceeds from operation 610 to operation 618, where a socket-level resource allocation adjustment is performed. This process is described below with regard to FIG. 7.

If stacks having valid memory address resource allocations are present, the routine 600 proceeds from operation 610 to operation 612. At operation 612, the firmware identifies memory address resources that are available from stacks that were previously allocated sufficient memory address resources. Because the initial allocation of memory address resources described above was performed using a fixed ratio, some stacks might have been allocated more memory address resources than required. These resources are identified at operation 612.

From operation 612, the routine 600 proceeds to operation 614. At operation 614, the firmware determines whether the memory address resources identified at operation 612 are sufficient to satisfy the remaining memory resource allocation requirements of those stacks that did not have their resource requirements satisfied. If not, the routine 600 proceeds from operation 614 to operation 618, where a socket-level resource allocation adjustment is performed. This process is described below with regard to FIG. 7.

If, however, the memory address resources identified at operation 612 are sufficient to satisfy the remaining memory resource allocation requirements of those stacks that did not have their resource requirements satisfied, the routine 600 proceeds from operation 614 to operation 616. At operation 616, the firmware assigns available memory address resources from stacks whose resource requirements were satisfied to stacks whose resource requirements have not been previously satisfied.

From operation 616, the routine 600 proceeds to operation 620, where the firmware determines whether the previous allocation of memory address resources is the same as the allocation of memory address resources following the stack-level adjustment process described above. If the allocations are the same, this indicates that the stack-level adjustment was unsuccessful. Accordingly, in this case the routine 600 proceeds from operation 620 to operation 624 and, subsequently, returns to operation 522, discussed above with regard to FIG. 5A. If the allocations are not the same, this indicates that the stack-level adjustment was successful. Accordingly, in this case the routine 600 proceeds from operation 620 to operation 622 and, subsequently, returns to operation 522, discussed above with regard to FIG. 5A.

Figure 7:
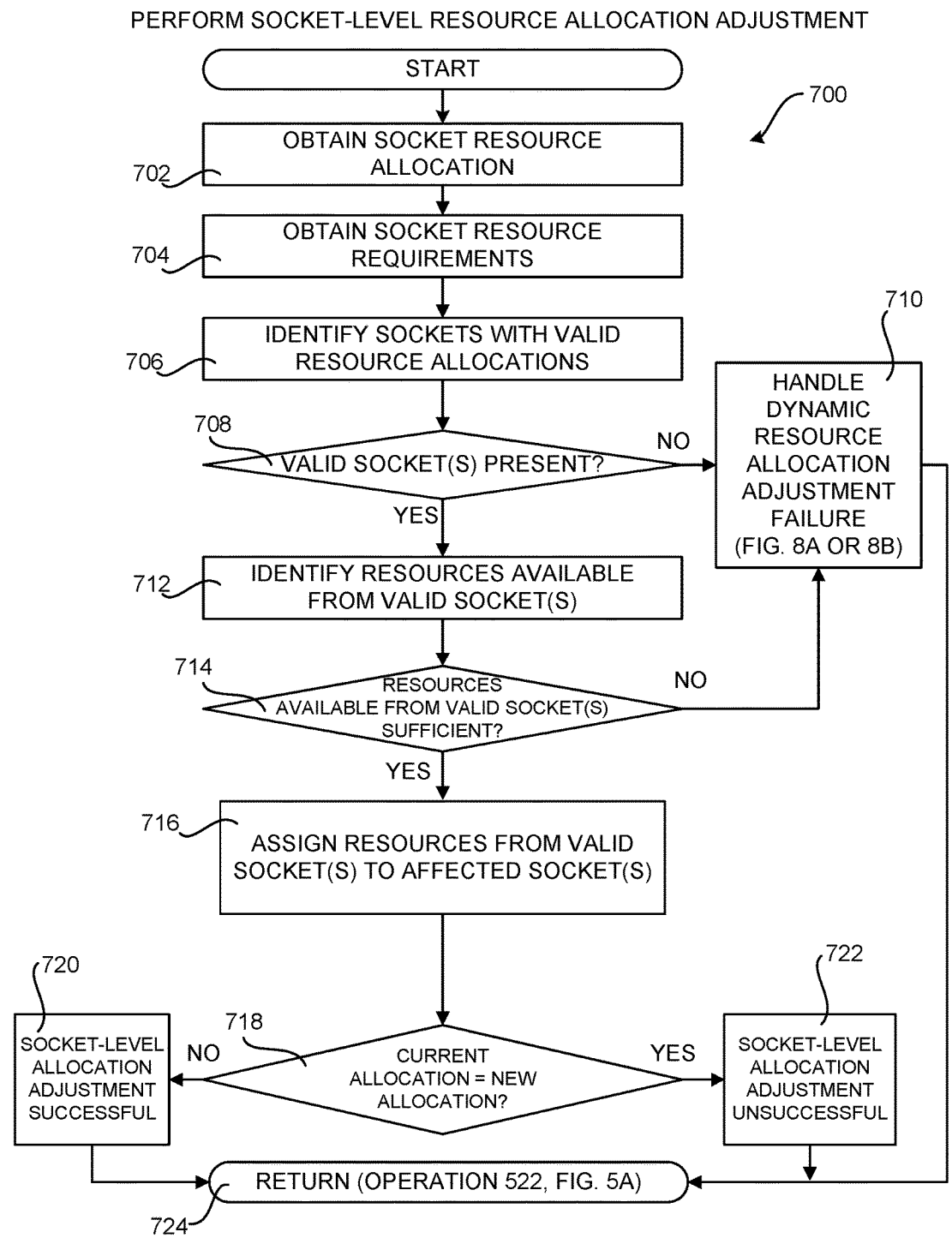
FIG. 7 is a flow diagram showing a routine that illustrates aspects of the technologies disclosed herein for performing socket-level memory address resource allocation adjustment in the event of an OOR condition, according to one embodiment disclosed herein.

FIG. 7 is a flow diagram showing a routine 700 that illustrates aspects of the technologies disclosed herein for performing socket-level memory address resource allocation adjustment in the event of an OOR condition, according to one embodiment disclosed herein. The routine 700 begins at operation 702, where the firmware obtains data describing the initial socket-level memory address resource allocation performed above at operation 506. The routine 700 then proceeds from operation 702 to operation 704, where the firmware obtains the resource requirements for the sockets in the computing system 100 in the manner described above. The routine 700 then proceeds from operation 704 to operation 706.

At operation 706, the firmware identifies any sockets having valid memory address resource allocations. As in the case with stacks, a valid allocation of memory address resource to a socket is one that satisfies all of the requirements of the bus devices 110 connected to the socket. If no sockets having valid memory address resource allocations are present, the routine 700 proceeds from operation 708 to operation 710. At operation 710, the failure of the dynamic memory address resource allocation adjustment process described above is handled. As discussed above, this failure can be handled in different ways, several of which are described below with regard to FIGS. 8A and 8B.

If sockets having valid memory address resource allocations are identified at operations 706 and 708, the routine 700 proceeds from operation 708 to operation 712. At operation 712, the firmware identifies memory address resources that are available from sockets that were previously allocated sufficient memory address resources. Because the initial allocation of memory address resources to sockets described above was performed using a fixed ratio, some sockets might have been allocated more memory address resources than required. These resources are identified at operation 712.

From operation 712, the routine 700 proceeds to operation 714. At operation 714, the firmware determines whether the memory address resources identified at operation 712 are sufficient to satisfy the remaining memory resource allocation requirements of those sockets that did not have their resource requirements satisfied. If not, the routine 700 proceeds from operation 714 to operation 710, where the failure of the socket-level dynamic memory address resource allocation adjustment process described above is handled. As discussed above, this failure can be handled in different ways, several of which are described below with regard to FIGS. 8A and 8B.

If, however, the memory address resources identified at operation 712 are sufficient to satisfy the remaining memory resource allocation requirements of those sockets that did not have their resource requirements satisfied, the routine 700 proceeds from operation 714 to operation 716. At operation 716, the firmware assigns available memory address resources from sockets whose resource requirements were satisfied to sockets whose resource requirements have not been previously satisfied.

From operation 716, the routine 700 proceeds to operation 718, where the firmware determines whether the previous allocation of memory address resources is the same as the allocation of memory address resources following the socket-level adjustment process described above. If the allocations are the same, this indicates that the socket-level adjustment was unsuccessful. Accordingly, in this case the routine 700 proceeds from operation 718 to operation 722 and, subsequently, returns to operation 522, discussed above with regard to FIG. 5A. If the allocations are not the same, this indicates that the socket-level adjustment was successful. Accordingly, in this case the routine 700 proceeds from operation 718 to operation 720 and, subsequently, returns to operation 522, discussed above with regard to FIG. 5A.

Figure 8A:
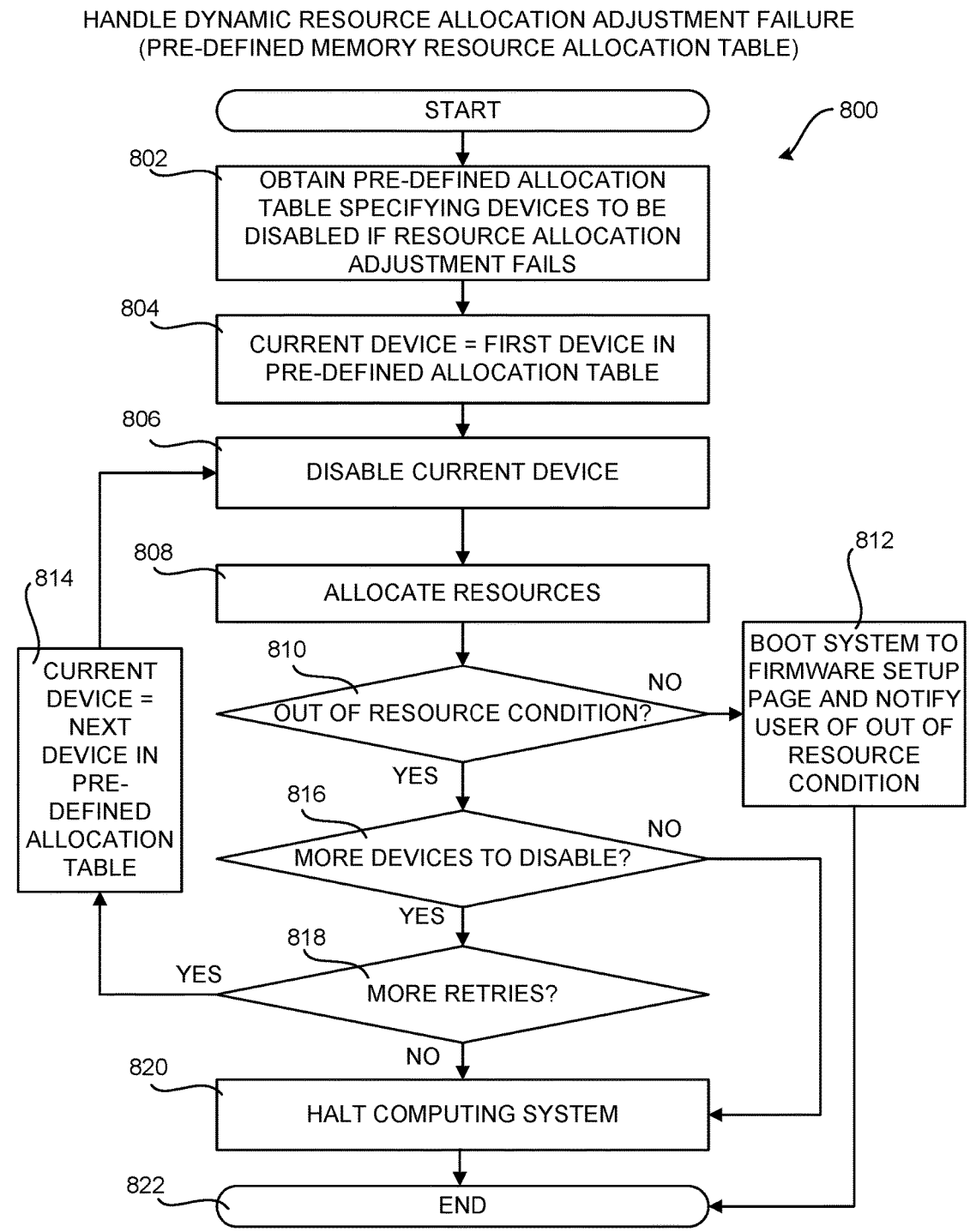
FIG. 8A is a flow diagram showing a routine that illustrates aspects of one mechanism for handling failure of the routines shown in FIGS. 6 and 7 for dynamic resource allocation adjustment, according to one embodiment disclosed herein.

FIG. 8A is a flow diagram showing a routine 800 that illustrates aspects of one mechanism for handling failure of the routines shown in FIGS. 6 and 7 for dynamic resource allocation adjustment, according to one embodiment disclosed herein. The routine 800 begins at operation 802, where the firmware of the computing system 100 obtains a pre-defined memory address allocation table.

The pre-defined memory address allocation table specifies bus devices 110 that are to be disabled in the event resource allocation adjustment fails. The pre-defined memory address allocation table can also specify the order in which devices are to be disabled. For example, the pre-defined memory address allocation table might be defined such that a PCI video card is not disabled. As discussed below, this allows the computing system 100 to boot and provide an error message to a user of the computing system 100 indicating that an OOR condition has occurred.

From operation 802, the routine 800 proceeds to operation 804, where a variable is initialized that stores data identifying the current device in the pre-defined memory address allocation table. In particular, the current device is set as the first device in the pre-defined memory address allocation table. The routine 800 then proceeds to operation 806, where the current bus device 110 is disabled. This can be accomplished by writing all zeros to the devices' BARs 410.

From operation 806, the routine 800 proceeds to operation 808, where the firmware attempts to allocate memory address resources to the bus devices 110 that have not been disabled. If an OOR condition does not occur following the allocation, the routine 800 proceeds from operation 810 to operation 812, where the computing system 100 is booted into a firmware setup program, and a message is presented indicating that an OOR condition occurred. The routine 800 then proceeds from operation 812 to operation 822, where it ends.

If, at operation 810, the firmware determines that an OOR condition has occurred, the routine 800 proceeds to operation 816, where a determination is made as to whether more bus devices 110 remain in the pre-defined memory address allocation table that can be disabled. If no additional devices remain in the pre-defined memory address allocation table to be disabled, the routine 800 proceeds from operation 816 to operation 820, where execution of the computing system 100 is halted. The routine 800 then proceeds from operation 820 to operation 822, where it ends.

If additional devices 110 remain in the pre-defined memory address allocation table to be disabled, the routine 800 proceeds from operation 816 to operation 818. At operation 818, the firmware determines whether additional devices are to be disabled. In this manner, the firmware can limit the number of devices 110 that are disabled, and the number of reboots of the computing system 100 that are performed, before the computing system 100 is halted. If no additional retries are available, the routine 800 proceeds from operation 818 to operation 820, where execution of the computing system 100 is halted. The routine 800 then proceeds from operation 820 to operation 822, where it ends.

If additional retries remain, the routine 800 proceeds from operation 818 to operation 814, where the variable identifying the current device is incremented such that it identifies the next bus device 100 in the pre-defined memory address allocation table. The routine 800 then proceeds from operation 814 back to operation 806, where the operations described above can be repeated.

Figure 8B:
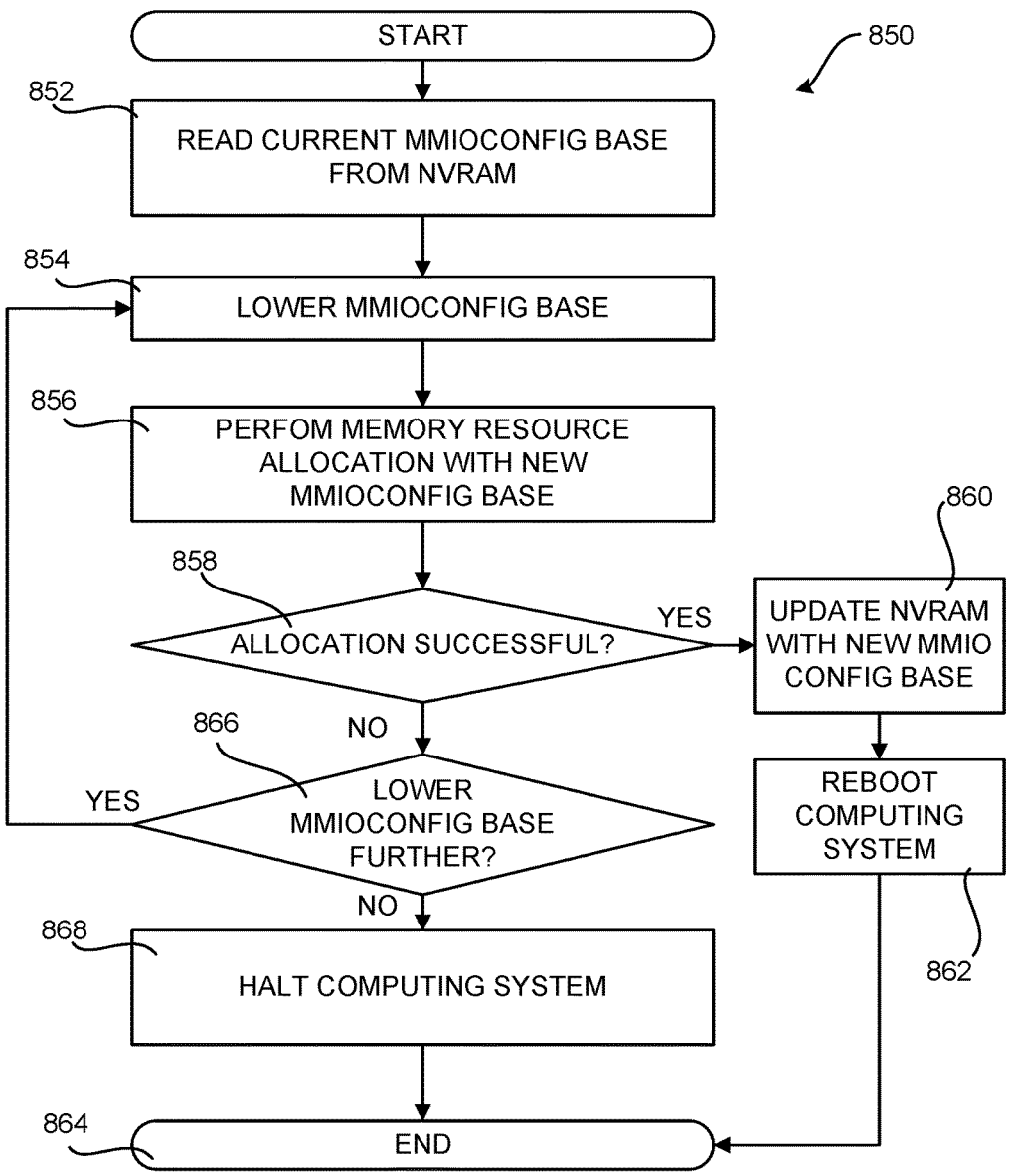
FIG. 8B is a flow diagram showing a routine that illustrates aspects of another mechanism for handling failure of the routines shown in FIGS. 6 and 7 for dynamic resource allocation adjustment, according to one embodiment disclosed herein.

FIG. 8B is a flow diagram showing a routine 850 that illustrates aspects of another mechanism for handling failure of the routines shown in FIGS. 6 and 7 for dynamic resource allocation adjustment, according to one embodiment disclosed herein. In this example, the MMIOCONFIG BASE parameter described above with regard to FIG. 2 is repeatedly lowered in an attempt to free enough memory address resources in order to successfully satisfy the memory address resource requirements of the stacks and sockets in the computing system 100.

The routine 850 begins at operation 852, where the current value of the MMIOCONFIG BASE parameter is read from a non-volatile memory device, like an NVRAM. The routine 850 then proceeds to operation 854, where the MMIOCONFIG BASE parameter is lowered. For example, and without limitation, if the MMIOCONFIG BASE parameter is currently set at 3 GB, the parameter might be lowered to 2.25 GB. Similarly, if the MMIOCONFIG BASE parameter is currently set at 2.25 GB, the parameter might be lowered to 2 GB. The MMIOCONFIG BASE parameter can be further lowered to 1 GB or another value.

From operation 854, the routine 850 proceeds to operation 856, where memory resource allocation is performed in the manner described above using the lowered MMIOCONFIG BASE. The routine 850 then proceeds to operation 858, where the firmware determines if the allocation performed at operation 856 was successful. If the allocation was successful, the routine 850 proceeds from operation 858 to operation 860, where the non-volatile memory (e.g. NVRAM) is updated with the new value for the MMIOCONFIG BASE parameter. The computing system 100 is then rebooted at operation 862 in order to boot using the new value for the MMIOCONFIG BASE parameter. The routine 850 then continues from operation 862 to operation 864, where it ends.

If the firmware determines that the allocation was not successful at operation 858, the routine 850 proceeds to operation 866. At operation 866, the firmware determines whether the value of the MMIOCONFIG BASE parameter can be lowered further (e.g. whether the value of the MMIOCOFIG BASE is already at 1 GB). If the value of the MMIOCONFIG BASE parameter can be lowered further, the routine 850 proceeds from operation 866 to operation 854, described above. If the value of the MMIOCONFIG BASE parameter cannot be lowered any further, the routine 850 proceeds from operation 866 to operation 868, where operation of the computing system 100 is halted. The routine 850 then proceeds to operation 864, where it ends.

Figure 9:
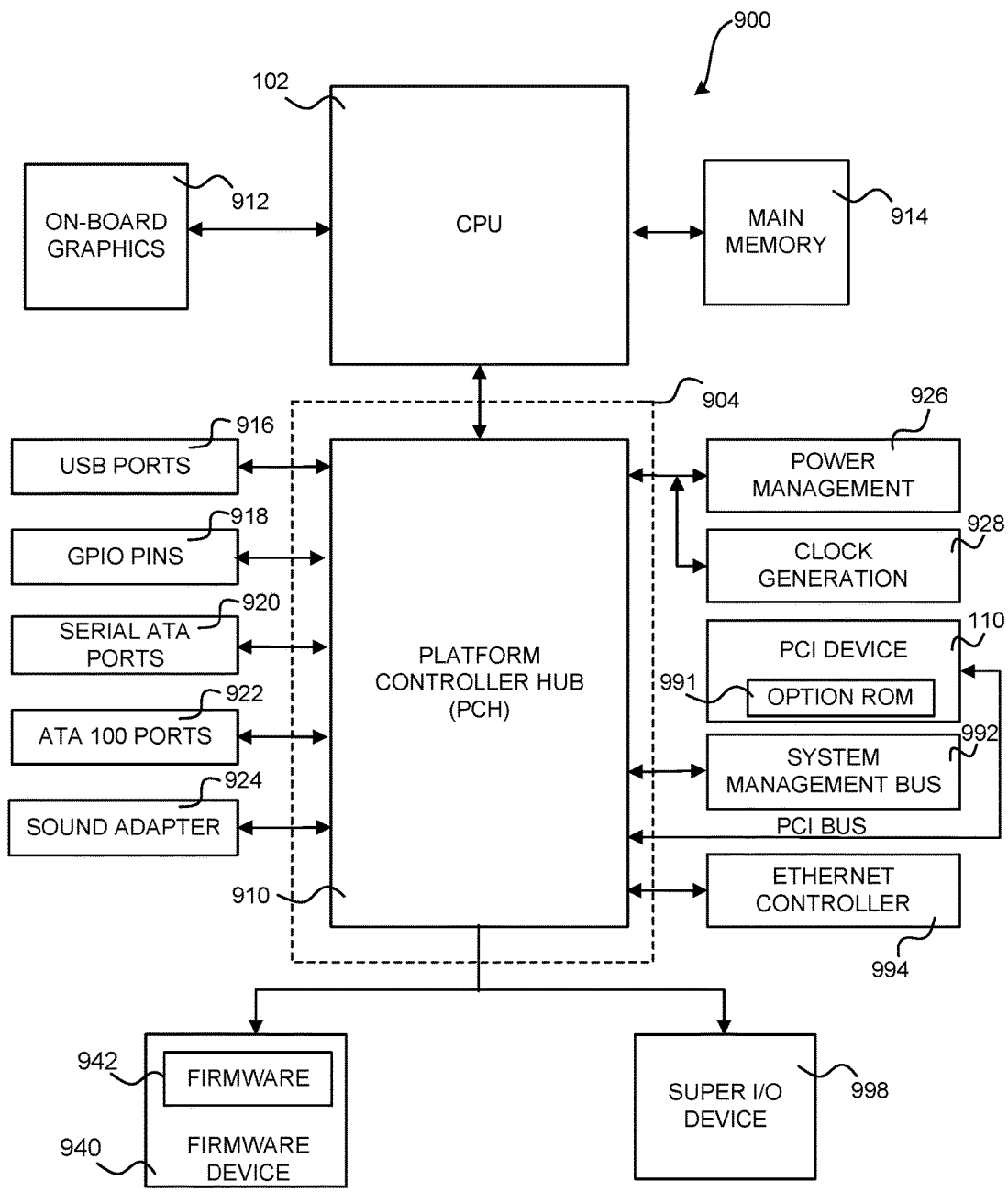
FIG. 9 is a computer architecture diagram that illustrates various components of a computing device that can provide the functionality disclosed herein.

Referring now to FIG. 9, an illustrative computer architecture for a computer 900 capable of implementing the various technologies discussed herein will be described. The computer architecture shown in FIG. 9 can be utilized to implement the technologies disclosed herein for distribution of memory address resources to bus devices in multiprocessor computing systems. It should be appreciated that although the configurations described herein are discussed primarily in the context of a server computer, the configurations can be utilized with virtually any type of computing device that utilizes multiple processors.

In order to provide the functionality described herein, the computer 900 can include a baseboard, or motherboard (not shown in FIG. 9). The motherboard can be a printed circuit board to which some or all of the components shown in FIG. 9 can be connected by way of a system bus or other electrical communication path.

In one illustrative configuration, the motherboard includes multiple CPUs 102 (only one CPU 102 is shown in FIG. 9) configured to operate in conjunction with a chipset 904. The CPUs 102 can be central processors that perform arithmetic and logical operations necessary for the operation of the computer. For example, the CPU 102 might be a CPU available from INTEL CORPORATION, AMD CORPORATION, or a CPU based upon the ARM architecture from ARM HOLDINGS. Other types of CPUs might also be utilized. In some configurations, the CPUs 102 include an interface to a random access memory ("RAM") used as the main memory 914 in the computer 900 and, possibly, to an on-board graphics adapter 912.

In one implementation, particularly where CPUs available from INTEL CORPORATION or AMD CORPORATION are utilized, the chipset 904 includes a platform controller hub ("PCH") 942. In implementations where a CPU 102 based upon the ARM architecture is utilized, a system-on-chip ("SOC") can be utilized, which can include some or all of the various components described below.

The PCH 910 provides an interface between the CPU 102 and the remainder of the computer 900. The PCH 910 can also provide functionality for enabling networking communication through an Ethernet controller 994, or another type of network interface. The Ethernet controller 994 can connect the computer 900 to another computer via a network. Connections that can be made by the Ethernet controller 994 can include local area network ("LAN") or wide area network ("WAN") connections. LAN and WAN networking environments are commonplace in offices, enterprise-wide computer networks, intranets, and the Internet.

The PCH 910 can also include components for controlling many of the input/output functions of the computer 900. In particular, the PCH 910 can provide one or more universal serial bus ("USB") ports 916, a sound adapter 924, the Ethernet controller 994, and one or more general purpose input/output ("GPIO") pins 918. The PCH 910 can also provide a system management bus 992 for use in managing the various components of the computer 900. Power management circuitry 926 and clock generation circuitry 928 can also be utilized during the operation of the PCH 910.

The PCH 910 can also provide a bus for interfacing peripheral card devices or add-in cards 110, such as a SCSI host bus adapter. As discussed above, the bus comprises a PCI bus in one configuration. It should be appreciated that other types of add-in cards compliant with other types of bus standards might also be utilized. The add-in card 110 might also include an option ROM 991. As known to those skilled in the art, the option ROM 991 of an add-in card 110 contains program code executable by the CPU 102, such as a firmware driver that is used to connect the device to the system once the option ROM 991 is loaded.

The PCH 910 can also provide one or more interfaces for connecting mass storage devices to the computer 900. For instance, according to one configuration, the PCH 910 includes a serial advanced technology attachment ("SATA") adapter for providing one or more SATA ports 920 and an ATA100 adapter for providing one or more ATA100 ports 922. The SATA ports 920 and the ATA100 ports 922 can be, in turn, connected to one or more mass storage devices (not shown in FIG. 9) storing an OS and application programs. As known to those skilled in the art, an OS comprises a set of programs that control operations of a computer and allocation of resources. An application program is software that runs on top of the OS and uses computer resources made available through the OS to perform application-specific tasks.

The mass storage devices connected to the PCH 910 and the SCSI host bus adapter 110, and their associated computer-readable storage media, can provide non-volatile storage for the computer 900. In addition to these mass storage devices, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of locations within given magnetic media. These transformations can also include altering the physical features or characteristics of locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPUs 102 and executed, transform a general-purpose computing system into a special-purpose computing system customized to facilitate all, or part of, the operations disclosed herein. As detailed throughout this description, the program modules can provide various tools or techniques by which the computer 900 can participate within the overall systems or operating environments using the components, logic flows, and/or data structures discussed herein.

As also shown in FIG. 9, a low pin count ("LPC") interface can also be provided by the PCH 910 for connecting a "Super I/O" device 998. The Super I/O device 998 is responsible for providing I/O ports, including, but not limited to, a keyboard port, a mouse port, a serial interface, a parallel port, and other types of I/O ports. The LPC interface can also connect a firmware device 940 such as a ROM, EPROM, or a flash memory such as a non-volatile random access memory ("NVRAM") for storing the firmware 942 that includes program code containing the routines that help to start up the computer 900 and to transfer information between elements within the computer 900. As discussed above, in one configuration the firmware 942 is a firmware that is compliant with the UEFI Specification.

The LPC interface can also be utilized to connect a NVRAM (not depicted to FIG. 9) to the computer 900. The NVRAM can be utilized by the firmware 942 to store configuration data for the computer 900. The configuration data for the computer 900 can also be stored on the same device as the firmware 942 in some configurations.

The computer 900 can be implemented as an embedded control computer, a laptop, a server computer, a mobile device, a set-top box, a kiosk, a tablet or slate computing device, a vehicular information system, a mobile telephone, a customized machine, or other hardware platform. The CPU 102 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 102 can be constructed from transistors and/or other circuit elements, which can individually or collectively assume any number of states. More specifically, the CPU 102 can operate as a state machine or finite-state machine. Such a machine can be transformed to a second machine, or a specific machine, by loading executable instructions contained within the program modules (e.g. the modules making up the firmware 942). These computer-executable instructions can transform the CPU 102 by specifying how the CPU 102 transitions between states, thereby transforming the transistors or other circuit elements constituting the CPU 102 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, tablet or slate computing devices, personal digital assistants, or another type of computing device. It is also contemplated that the computer 900 might not include all the components shown in FIG. 9, can include other components that are not explicitly shown in FIG. 9, or can utilize an architecture completely different than that shown in FIG. 9.

Figure 10:
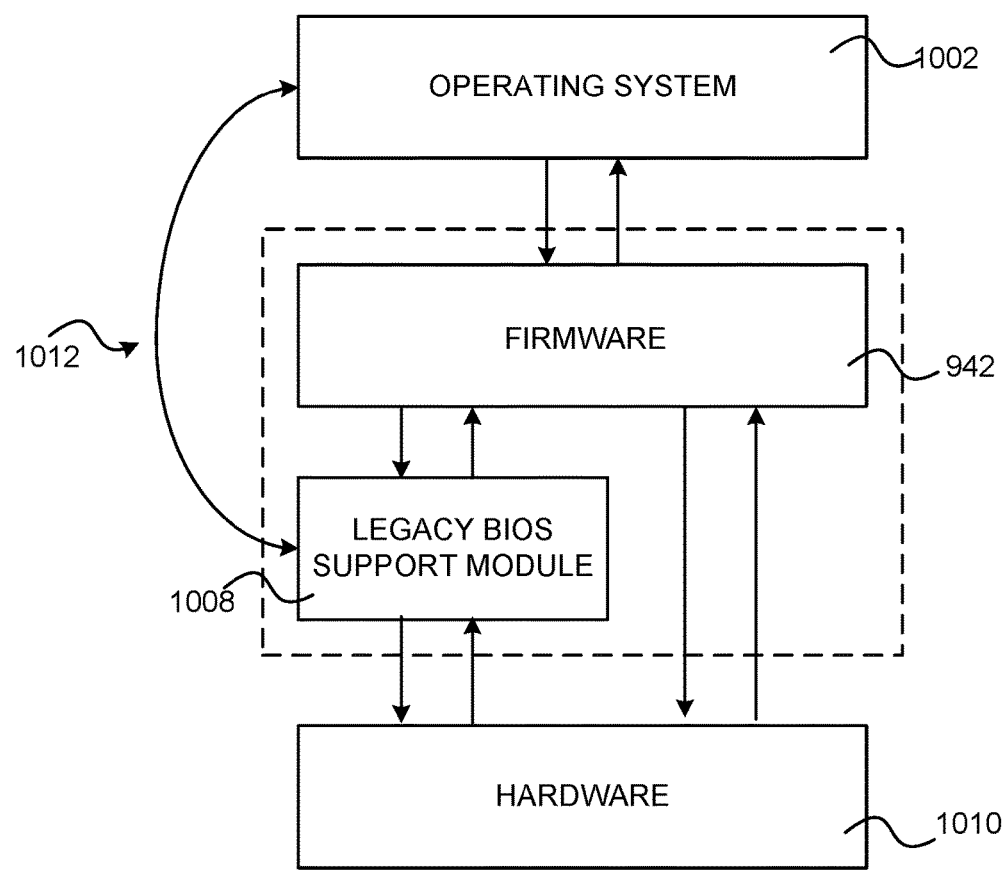
FIG. 10 is a software architecture diagram illustrating aspects of an interface between a UEFI Specification-compliant firmware and an operating system according to one or more embodiments presented herein.

Referring now to FIG. 10, a software architecture diagram will be described that illustrates aspects of an interface between a firmware 942, such as a UEFI Specification-compliant firmware, and an operating system 1002 according to one or more configurations presented herein. As described above, a firmware 942 can include a firmware that is compliant with the UEFI Specification. The term "UEFI Specification" as used herein refers to both the EFI Specification developed by INTEL CORPORATION and the UEFI Specification managed by the UEFI FORUM.

The UEFI Specification describes an interface between the operating system 1002 and the firmware 942. The UEFI Specification also defines an interface that the firmware 942 can implement, and an interface that the operating system 1002 can use while booting. How the firmware 942 implements the interface can be left up to the manufacturer of the firmware. The UEFI Specification also defines a way for the operating system 1002 and firmware 942 to exchange information necessary to support the operating system boot process.

According to some configurations, both a UEFI-compliant firmware 942 and a legacy BIOS support module 1008 can be present. This allows the computer 900 to support a UEFI firmware interface and a legacy BIOS firmware interface. To provide this functionality, an interface 1012 can be provided for use by legacy operating systems and applications. According to other configurations, only one of the UEFI-compliant firmware 942 and the legacy BIOS support module 1008 are present in the firmware. According to yet other configurations, the firmware 942 can interface with the platform hardware 1010 through any of various other architectures, components, or modules for the firmware without specific involvement of the UEFI-compliant firmware or the legacy BIOS support module 1008. Additional details regarding the operation and architecture of a UEFI Specification-compliant firmware can be found in the UEFI Specification.

Figure 11:
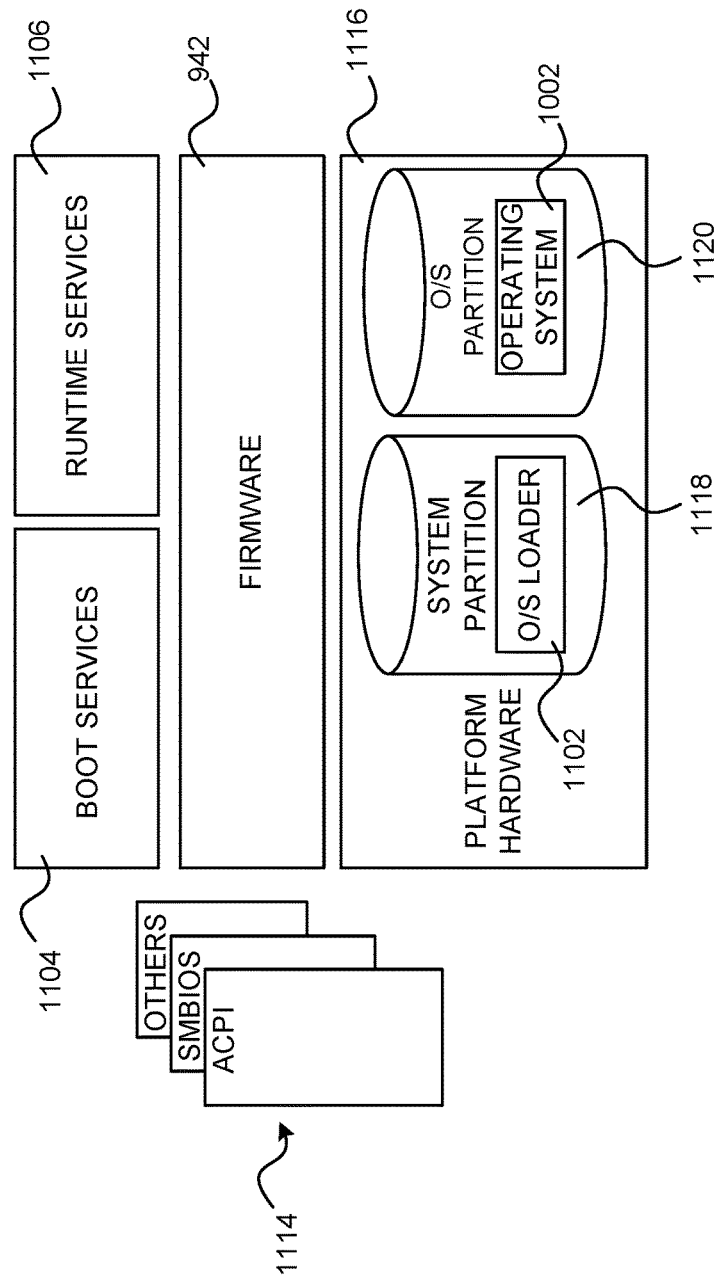
FIG. 11 is a software architecture diagram illustrating an architecture for a UEFI Specification-compliant firmware that provides an operating environment for one or more embodiments presented herein.

Turning now to FIG. 11, a block diagram will be described that illustrates an architecture for a UEFI Specification-compliant firmware that provides an operating environment for one or more configurations presented herein. As shown in FIG. 11, the architecture can include platform hardware 1116 and an OS 1002. The firmware 942 can retrieve an OS image from the UEFI system partition 1118 using a UEFI operating system loader 1102. The UEFI system partition 1118 can be an architecturally shareable system partition that provides a file system designed to support safe sharing of mass storage between multiple vendors. An OS partition 1120 can also be utilized. The UEFI Specification defines the structure of the UEFI system partition 1118.

Once started, the UEFI OS loader 1102 can continue to boot the complete operating system 1002. In doing so, the UEFI OS loader 1102 can use UEFI boot services 1104 and interface to other supported specifications to survey, comprehend, and initialize the various platform components and the operating system software that manages them. Thus, interfaces 1114 from other specifications can also be present on the system. For example, the Advanced Configuration and Power Management Interface ("ACPI") and the System Management BIOS ("SMBIOS") specifications can be supported.

UEFI boot services 1104 can provide interfaces for devices and system functionality used during boot time. UEFI runtime services 1106 can also be available to the UEFI OS loader 1102 during the boot phase. For example, a set of run time services can be presented that support variables, time/date, capsule, reset, and the like. UEFI allows extension of platform firmware by loading UEFI driver and UEFI application images which, when loaded, have access to UEFI-defined runtime and boot services.

It should be appreciated that while the illustrative operating environment presented above has been described primarily in the context of a UEFI Specification-compliant firmware, it is to be understood that the configurations disclosed herein are not limited to use with a UEFI Specification-compliant firmware. Similar configurations can be utilized in other pre-boot firmware execution environments, such as that provided by a firmware compliant with the OPEN FIRMWARE specification or another type of open or proprietary firmware.

It should also be appreciated that technologies have been disclosed herein for distribution of memory address bus resources to bus devices in a multi-processor computing system. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

The invention claimed is:

1. A non-transitory computer-readable storage medium having computer-executable instructions stored thereupon which, when executed by a multi-processor computing system, cause the multi-processor computing system to:
   detect an out-of-resource (OOR) condition when performing an allocation of memory address resources to bus devices in the multi-processor computing system;
   responsive to detecting the OOR condition, determine whether a socket-level adjustment or a stack-level adjustment of the allocation of memory address resources to the bus devices is to be performed;
   responsive to determining that a stack-level adjustment of the allocation of memory address resources is to be performed, perform a stack-level memory address resource allocation adjustment by
      identifying memory address resources available from one or more stacks for which sufficient memory address resources were previously allocated, and
      assigning the memory address resources available from the one or more stacks to one or more other stacks for which sufficient memory address resources were not previously allocated; and
   responsive to determining that a socket-level adjustment of the allocation of memory address resources is to be performed, perform a socket-level memory address resource allocation adjustment by
      identifying memory address resources available from one or more sockets for which sufficient memory address resources were previously allocated, and
      assigning the memory address resources available from the one or more sockets to one or more other sockets for which sufficient memory address resources were not previously allocated.

2. The non-transitory computer-readable storage medium of claim 1, wherein the OOR condition occurs when the one or more other stacks cannot be allocated memory address resources sufficient to satisfy memory address resource requirements of the one or more other stacks.

3. The non-transitory computer-readable storage medium of claim 1, wherein the OOR condition occurs when the one or more other sockets cannot be allocated memory address resources sufficient to satisfy memory address resource requirements of the one or more other sockets.

4. The non-transitory computer-readable storage medium of claim 1, wherein a stack comprises a collection of bus devices connected to a root bridge of the computer.

5. The non-transitory computer-readable storage medium of claim 1, wherein the one or more sockets and the one or more other sockets correspond to processors in the computer.

6. The non-transitory computer-readable storage medium of claim 1, having further computer-executable instructions stored thereupon which, when executed by the multi-processor computing system, cause the multi-processor computing system to
determine if the stack-level memory address resource allocation adjustment and the socket-level memory address resource allocation adjustment failed; and
responsive to determining that the stack-level memory address resource allocation adjustment and the socket-level memory address resource allocation adjustment failed,
assigning memory address resources to the one or more stacks, the one or more other stacks, the one or more sockets, and the one or more other sockets using a pre-defined memory address resource allocation table.

7. The non-transitory computer-readable storage medium of claim 1, having further computer-executable instructions stored thereupon which, when executed by the multi-processor computing system, cause the multi-processor computing system to
determine if the stack-level memory address resource allocation adjustment and the socket-level memory address resource allocation adjustment failed; and
responsive to determining that the stack-level memory address resource allocation adjustment and the socket-level memory address resource allocation adjustment failed,
assigning memory address resources to the one or more stacks, the one or more other stacks, the one or more sockets, and the one or more other sockets following lowering of a memory address specifying the base memory address of a configuration memory address space.

8. A multi-processor computing system, comprising:
a plurality of central processing units (CPUs);
at least one bus having one or more bus devices connected thereto; and
a firmware device storing instructions which, when executed by at least one of the plurality of CPUs, will cause the multi-processor computing system to
detect an out-of-resource (OOR) condition when performing an allocation of memory address resources to the bus devices in the multi-processor computing system;
responsive to detecting the OOR condition, determine whether a socket-level adjustment or a stack-level adjustment of the allocation of memory address resources to the bus devices is to be performed;
responsive to determining that a stack-level adjustment of the allocation of memory address resources is to be performed, perform a stack-level memory address resource allocation adjustment by
identifying memory address resources available from one or more stacks for which sufficient memory address resources were previously allocated, and
assigning the memory address resources available from the one or more stacks to one or more other stacks for which sufficient memory address resources were not previously allocated; and
responsive to determining that a socket-level adjustment of the allocation of memory address resources is to be performed, perform a socket-level memory address resource allocation adjustment by
identifying memory address resources available from one or more sockets for which sufficient memory address resources were previously allocated, and
assigning the memory address resources available from the one or more sockets to one or more other sockets for which sufficient memory address resources were not previously allocated.

9. The multi-processor computing system of claim 8, wherein the OOR condition occurs when the one or more other stacks cannot be allocated memory address resources sufficient to satisfy memory address resource requirements of the one or more other stacks.

10. The multi-processor computing system of claim 8, wherein the OOR condition occurs when the one or more other sockets cannot be allocated memory address resources sufficient to satisfy memory address resource requirements of the one or more other sockets.

11. The multi-processor computing system of claim 8, wherein a stack comprises a collection of bus devices connected to a root bridge of the computer.

12. The multi-processor computing system of claim 8, wherein the one or more sockets and the one or more other sockets correspond to the CPUs.

13. The multi-processor computing system of claim 8, wherein the firmware device stores further instructions to:
determine if the stack-level memory address resource allocation adjustment and the socket-level memory address resource allocation adjustment failed; and
responsive to determining that the stack-level memory address resource allocation adjustment and the socket-level memory address resource allocation adjustment failed,
assigning memory address resources to the one or more stacks, the one or more other stacks, the one or more sockets, and the one or more other sockets using a pre-defined memory address resource allocation table.

14. The multi-processor computing system of claim 8, wherein the firmware device stores further instructions to:
determine if the stack-level memory address resource allocation adjustment and the socket-level memory address resource allocation adjustment failed; and
responsive to determining that the stack-level memory address resource allocation adjustment and the socket-level memory address resource allocation adjustment failed,
assigning memory address resources to the one or more stacks, the one or more other stacks, the one or more sockets, and the one or more other sockets following lowering of a memory address specifying the base memory address of a configuration memory address space.

15. A computer-implemented method, comprising:
detecting an out-of-resource (OOR) condition when performing an allocation of memory address resources to bus devices in the multi-processor computing system;
responsive to detecting the OOR condition, determining whether a socket-level adjustment or a stack-level adjustment of the allocation of memory address resources to the bus devices is to be performed;
responsive to determining that a stack-level adjustment of the allocation of memory address resources is to be performed, performing a stack-level memory address resource allocation adjustment by identifying memory address resources available from one or more stacks for which sufficient memory address resources were previously allocated, and assigning the memory address resources available from the one or more stacks to one or more other stacks for which sufficient memory address resources were not previously allocated; and responsive to determining that a socket-level adjustment of the allocation of memory address resources is to be performed, performing a socket-level memory address resource allocation adjustment by identifying memory address resources available from one or more sockets for which sufficient memory address resources were previously allocated, and assigning the memory address resources available from the one or more sockets to one or more other sockets for which sufficient memory address resources were not previously allocated.

16. The computer-implemented method of claim 15, wherein the OOR condition occurs when the one or more other stacks cannot be allocated memory address resources sufficient to satisfy memory address resource requirements of the one or more other stacks.

17. The computer-implemented method of claim 15, wherein the OOR condition occurs when the one or more other sockets cannot be allocated memory address resources sufficient to satisfy memory address resource requirements of the one or more other sockets.

18. The computer-implemented method of claim 15, wherein a stack comprises a collection of bus devices connected to a root bridge of the computer and wherein the one or more sockets and one or more other sockets correspond to processors in the computer.

19. The computer-implemented method of claim 15, further comprising:

determining if the stack-level memory address resource allocation adjustment and the socket-level memory address resource allocation adjustment failed; and responsive to determining that the stack-level memory address resource allocation adjustment and the socket-level memory address resource allocation adjustment failed, assigning memory address resources to the one or more stacks, the one or more other stacks, the one or more sockets, and the one or more other sockets using a pre-defined memory address resource allocation table.

20. The computer-implemented method of claim 15, further comprising:

determining if the stack-level memory address resource allocation adjustment and the socket-level memory address resource allocation adjustment failed; and responsive to determining that the stack-level memory address resource allocation adjustment and the socket-level memory address resource allocation adjustment failed, assigning memory address resources to the one or more stacks, the one or more other stacks, the one or more sockets, and the one or more other sockets following lowering of a memory address specifying the base memory address of a configuration memory address space.

\* \* \* \* \*